United States Patent [19]

Iijima

[11] Patent Number: 5,161,256

[45] Date of Patent: Nov. 3, 1992

[54] METHOD AND SYSTEM FOR ALLOCATING FILE AREA IN MEMORY AREA OF IC CARD

[75] Inventor: Yasuo Iijima, Yokohama, Japan

[73] Assignee: Kabushiki Kaisha Toshiba, Kawasaki, Japan

[21] Appl. No.: 398,080

[22] Filed: Aug. 24, 1989

[30] Foreign Application Priority Data

Aug. 26, 1988 [JP] Japan ............................... 63-211828
Aug. 31, 1988 [JP] Japan ............................... 63-216805
Aug. 31, 1988 [JP] Japan ............................... 63-216806

[51] Int. Cl.$^5$ ............................................. G06K 19/06
[52] U.S. Cl. ................................... 902/26; 902/4; 235/382
[58] Field of Search ... 364/200 MS File, 900 MS File; 902/25, 26, 4, 40; 235/382, 382.5, 380, 492

[56] References Cited

U.S. PATENT DOCUMENTS

| | | | |
|---|---|---|---|
| 4,816,653 | 3/1989 | Anderl et al. | 235/380 |
| 4,829,169 | 5/1989 | Watanabe | 235/492 |
| 4,849,878 | 7/1989 | Roy | 364/200 |
| 4,874,935 | 10/1989 | Younger | 235/492 |

Primary Examiner—Gareth D. Shaw
Assistant Examiner—Paul Kulik
Attorney, Agent, or Firm—Cushman, Darby & Cushman

[57] ABSTRACT

A data memory in an IC card is constituted by a common data file used commonly in all applications and a plurality of application data file independently used for each application. Each data file includes a plurality of areas. Identification data is provided to the data file and the area, respectively. By checking the identification data, duplicated definition can be prevented. By using data other than identification data provided to the common data file as identification data provided to the application data file, access for areas in the common data file and the application data file can be performed in accordance with the same command data.

7 Claims, 21 Drawing Sheets

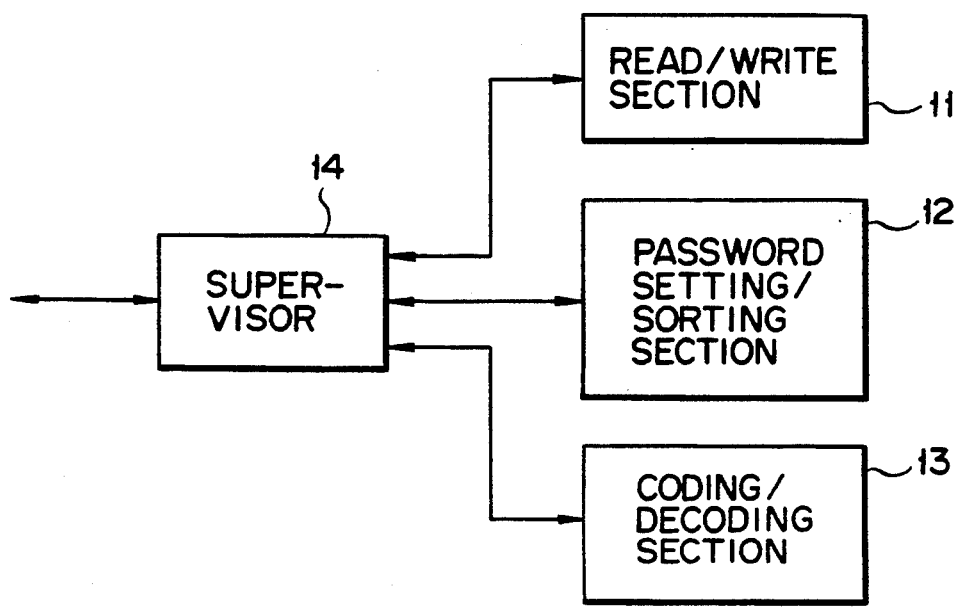
F I G. 2
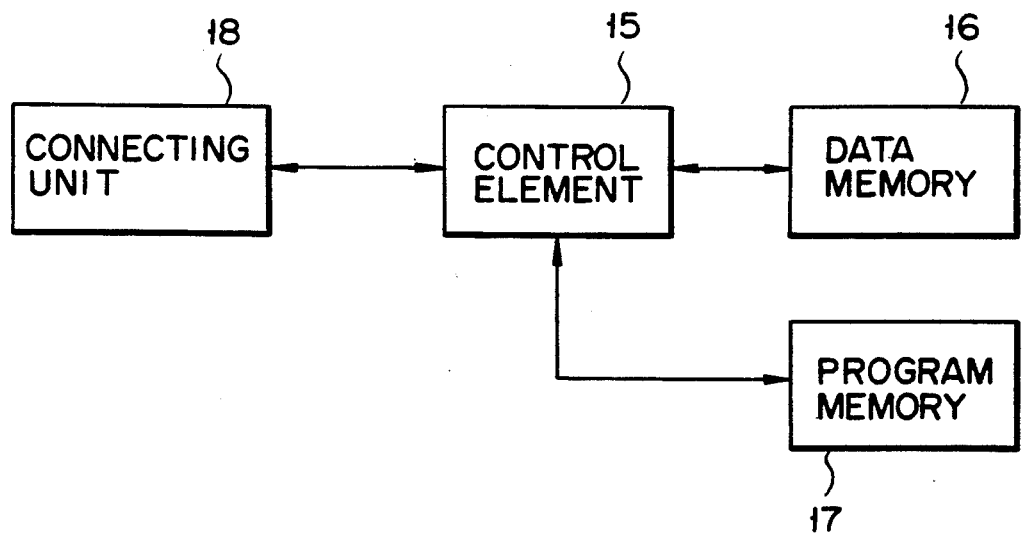
F I G. 3

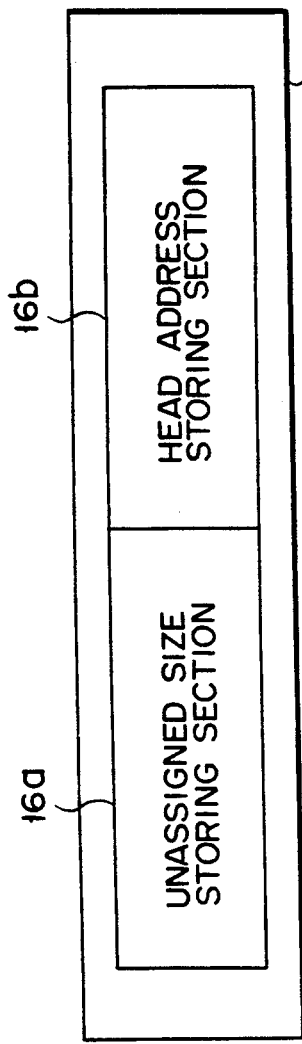

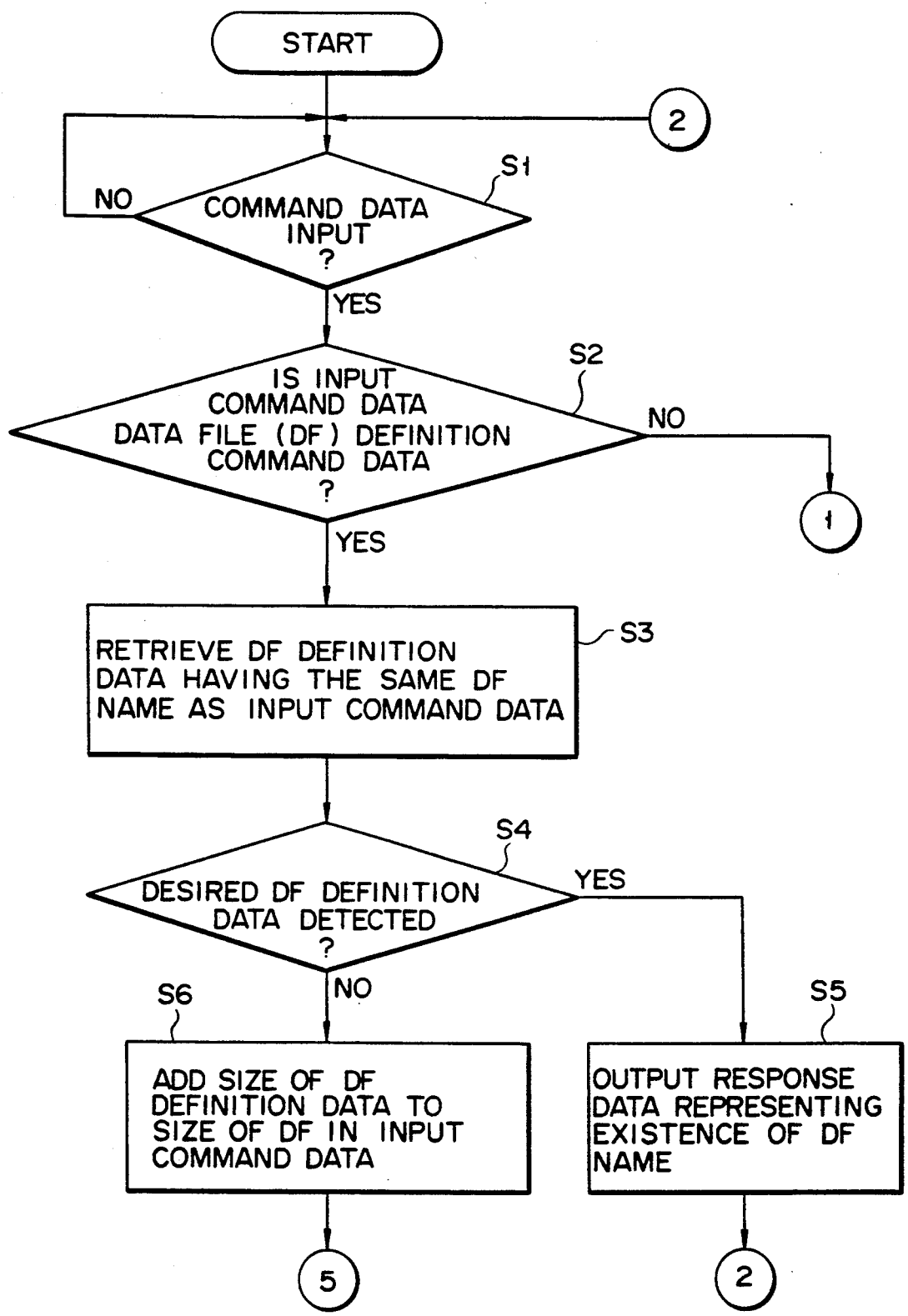
F I G. 10A

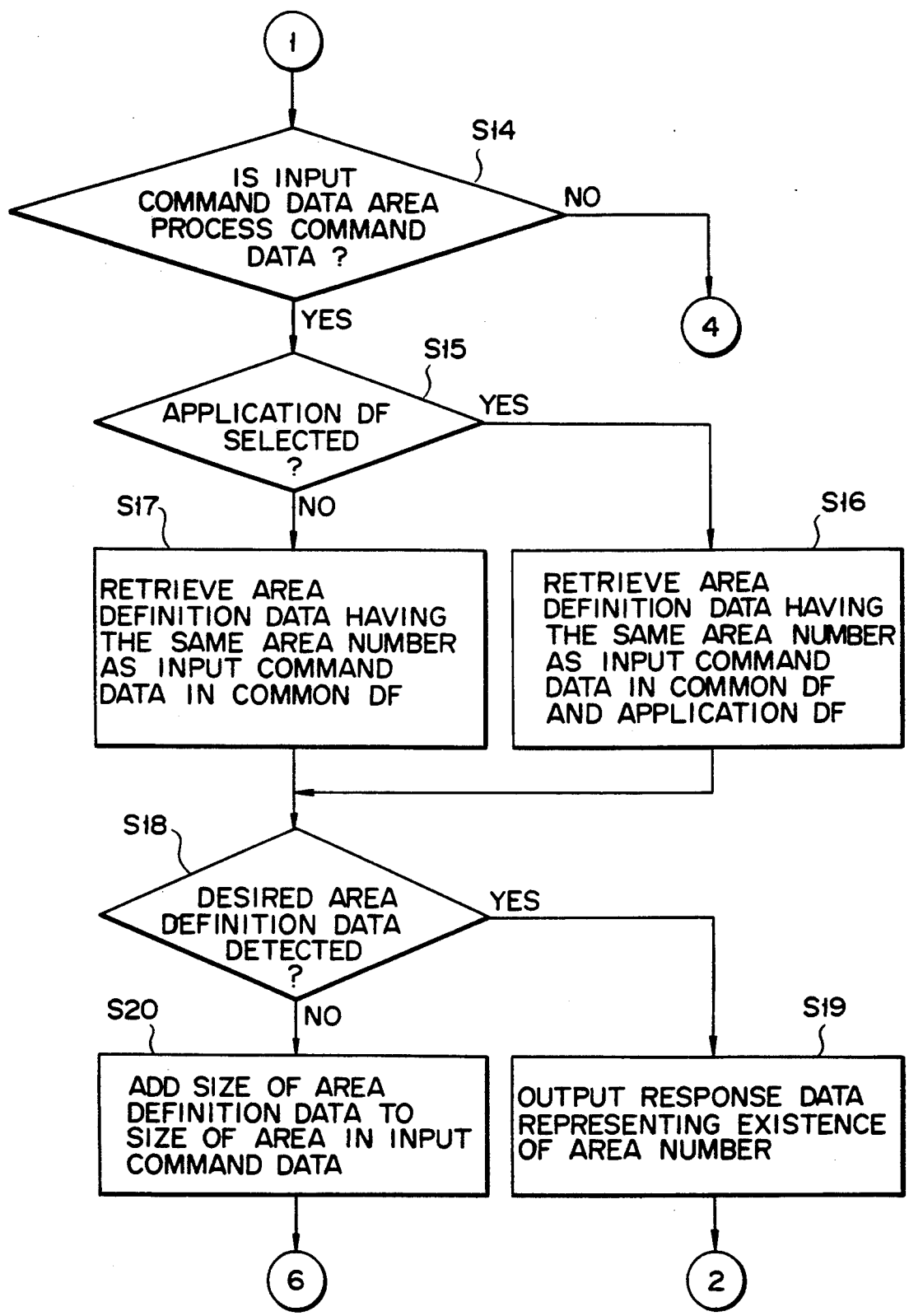
F I G. 10C

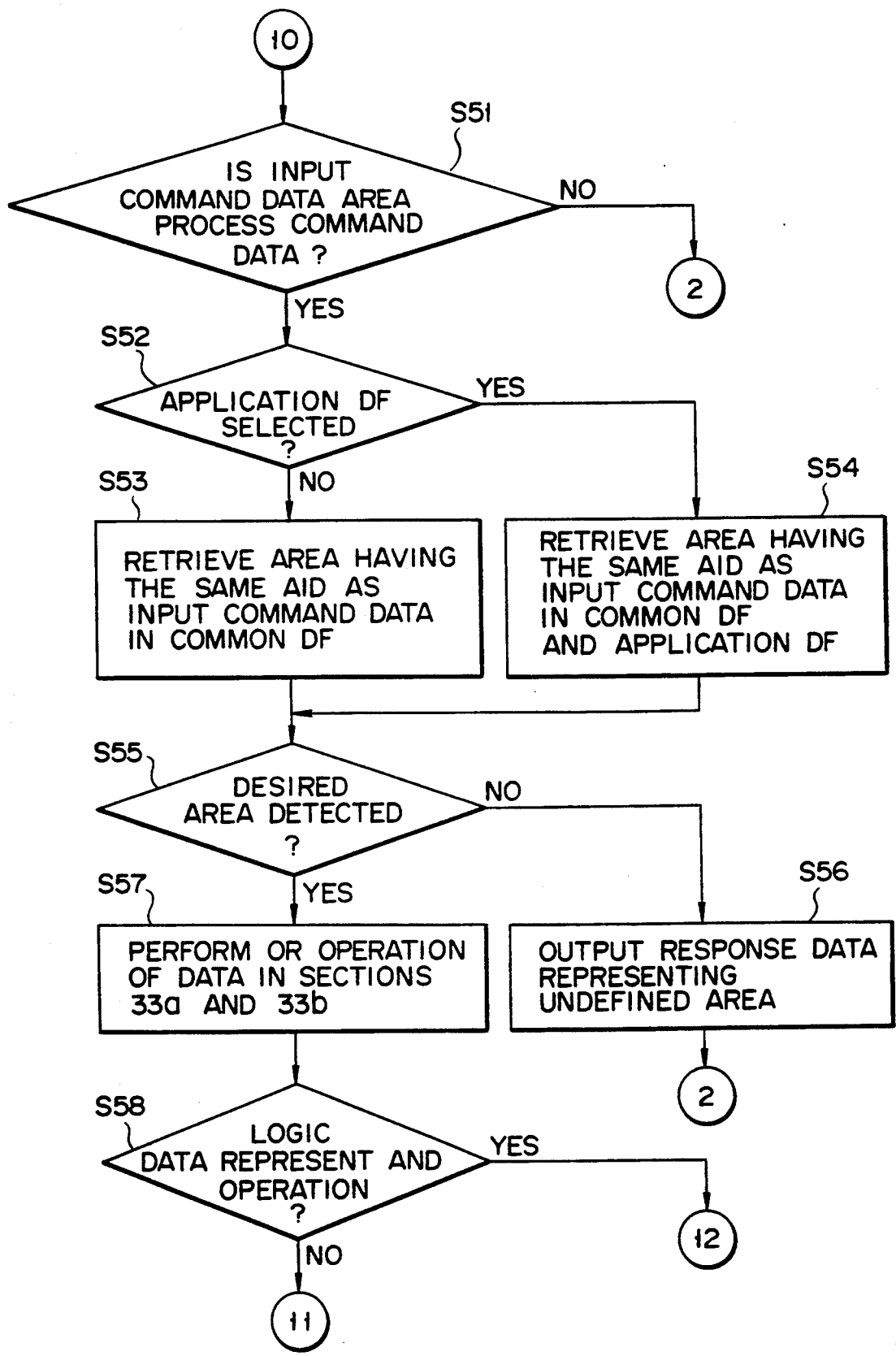
F I G. 101

| KID 01 | KEY DATA 1 | 10000000 | | AID 01 | AREA G | 10000000 | A |
|---|---|---|---|---|---|---|---|
| | | | | | | 10000000 | A |
| KID 02 | KEY DATA 2 | 01000000 | | AID 02 | AREA H | 10000000 | A |
| | | | | | | 01000000 | A |
| KID 03 | KEY DATA 3 | 00100000 | | | | | |

22a

| KID 04 | KEY DATA X4 | 00010000 | | AID 03 | AREA A | 10000000 | A |
| | | | | | | 10010000 | A |
| KID 05 | KEY DATA X5 | 00001000 | | AID 05 | AREA B | 10000000 | A |
| | | | | | | 00000000 | O |
| KID 06 | KEY DATA X6 | 00000100 | | AID 06 | AREA C | 00000000 | A |
| | | | | | | 00001100 | O |

DFN = NNNNN

22b

| KID 04 | KEY DATA Y4 | 00010000 | | AID 04 | AREA D | 10000000 | A |
| | | | | | | 00001000 | A |
| KID 05 | KEY DATA Y5 | 00001000 | | AID 05 | AREA E | 10000000 | A |
| | | | | | | 00010000 | O |
| KID 06 | KEY DATA Y6 | 00000100 | | AID 06 | AREA F | 10000000 | A |
| | | | | | | 00001000 | O |

DFN = ZZZZZ

FIG. 14
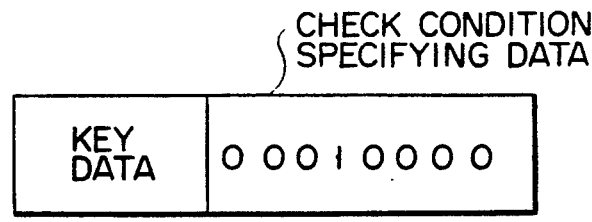
FIG. 15
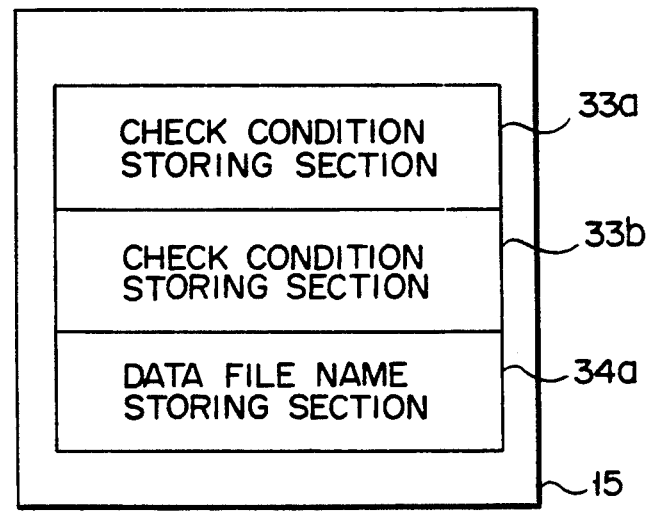
FIG. 16
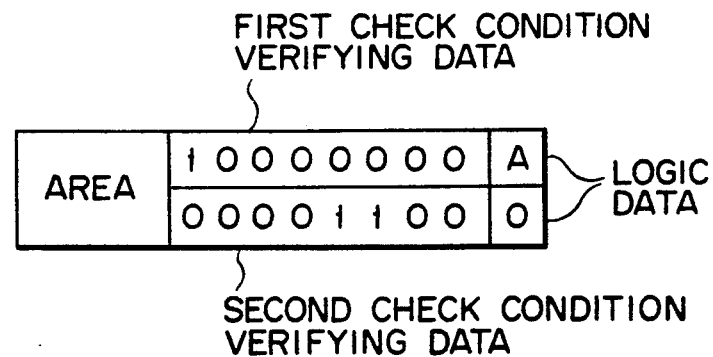
FIG. 17
| COMMAND CODE | SELECTION DATA |
|---|---|
| XX | * |
| YY | * |
| ZZ | 1 |
| WW | 2 |
| VV | 2 |

METHOD AND SYSTEM FOR ALLOCATING FILE AREA IN MEMORY AREA OF IC CARD

BACKGROUND OF THE INVENTION

1. Field of the Invention

The present invention relates to a method and system for processing data in a memory area of an IC card.

2. Description of the Related Art

In recent years, an IC (Integrated Circuit) card which incorporates an IC chip constituted by an erasable non-volatile memory and a control element such as a CPU (Central Processing Unit) has attracted attention as a new portable data storing medium. This IC card causes the control element to access the memory and selectively performs data input/output for an external apparatus.

In order to use this IC card in various applications, the memory is divisionally defined as a single command data file and a plurality of application data files, and each data file is divisionally defined as a plurality of areas.

Access to these areas can be performed by designating specifying data such as an area number provided to each area. The areas in a data file are accessed by designating specifying data such as a data file name affixed to each data file and selecting that data file.

According to such an IC card, data files are defined together in advance. Therefore, at the time of using an IC card, when all the applications to be used are not known, data files cannot be defined. Conventionally, the total size of definable data files is not known, so that data files could not defined. This prevents additional definition of data files.

According to this IC card, a plurality of passwords are stored in a memory. An externally input password is checked with the passwords stored in the memory, and enabling/disabling of access to an area is determined in accordance with the check result.

If specifying data provided to passwords and specifying data provided to areas are set so that the former data differ from the latter data, the number of areas set to a memory would influence the number of passwords set. This restricts the specifying data in use.

Access to an area in an application data file is performed by selecting a application data file in which the target area exists. It should be noted that access to areas in a common data file is possible irrespective of whether or not an application data file is selected. For instance, if areas in a common data file and those in an application data file can be accessed by the same command data, it is necessary to distinguish the specifying data for the common data file from that for the application data file. This necessitates to alter the check process depending on systems.

In view of the above circumstances, there is a demand for an IC card which can process data in memory areas with high efficiency.

SUMMARY OF THE INVENTION

It is an object of the present invention to provide method and system for processing data in a memory area of IC card.

According to one aspect of the present invention, there is provided a system for processing data in a memory area of an IC card, the memory area having a plurality of data files, the system comprising:

identification data storing means for storing identification data specifying for the defined data file;

determining means for determining whether or not the stored identification data coincides with prestored identification data; and defining means for defining the data file for the memory area in accordance with a determination result.

According to another aspect of the present invention, there is provided a system for processing data in a memory area of an IC card, the memory area having a plurality of data files, the system comprising:

first size storing means for storing first size data representing a size of each defined data file;

second size storing means for storing second size data representing a total size of the definable data file;

definition determining means for determining whether or not the new data file is defined in accordance with the first and second size data; and defining means for defining the data file for the memory area in accordance with a determination result.

BRIEF DESCRIPTION OF THE DRAWINGS

FIG. 2 is a block diagram illustrating the functional arrangement of the IC card;

FIG. 3 is a block diagram showing the arrangement of the IC card;

FIG. 9 is a block diagram of a storing section in a data memory;

FIGS. 10A to 10K are flowcharts for explaining operations of a control unit in the IC card;

FIG. 11 is a view illustrating the format of data file definition command data;

FIG. 12 is a view illustrating the format of area definition command data;

FIG. 13 is a view showing other structure of data files in the data memory;

FIG. 14 s a view for explaining data to be provided to key data;

FIG. 15 a block diagram of a storing section in the control unit;

FIG. 16 is a view for explaining data to be provided to an area;

FIG. 17 is a view illustrating a command code/selection data conversion table;

DETAILED DESCRIPTION OF THE PREFERRED EMBODIMENTS

A preferred embodiment of this invention will now be described referring to the accompanying drawings.

Figure 1:
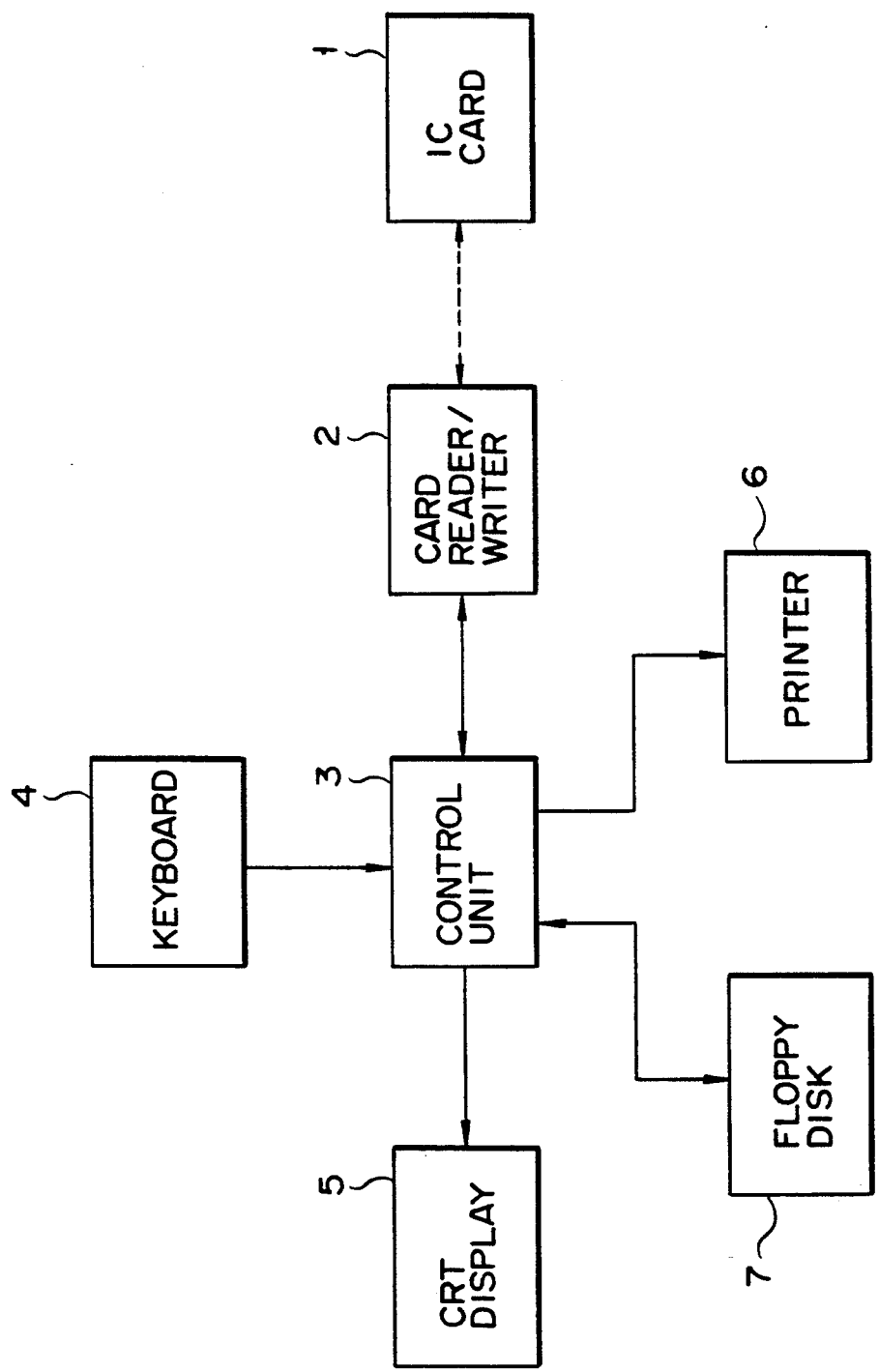
FIG. 1 is a block diagram illustrating the arrangement of a terminal apparatus for handling an IC card according to one embodiment of the present invention.

Referring to FIG. 1, a terminal apparatus for handling an IC card 1 comprises a card reader/writer 2, a control unit 3 constituted by a CPU or the like, a keyboard 4, a CRT (Cathode Ray Tube) display 5, a printer 6 and a floppy disk 7.

For example, in case of purchasing the IC card 1 carried by a user normally executes a password check and stores necessary data.

As shown in FIG. 2, the IC card is functionally constituted by a read/write section 11, a password setting-/sorting section 12, a coding/decoding section 13, and a supervisor 14 for supervising these sections. The read/-write section 11 performs data read/write. The password setting/sorting section 12 stores a password designated by a user and sorts the stored password.

In transmission of data to another terminal apparatus over a communication line, the coding/decoding section 13 encodes data so as to prevent leakage of data and decodes encoded data. For example, data is processed in accordance with a coding algorithm using an effective and strong encryption such as a DES (Data Encryption Standard). The supervisor 14 operates the sections 11, 12 and 13 in accordance with data from the card reader/writer 2.

In order to execute the above functions, the IC card 1 includes a control element 15 constituted by a CPU or the like, a data memory 16, a program memory 17, and a connecting unit 18 for connecting to the card reader/-writer 2, as shown in FIG. 3. It should be noted that the control element 15, the data memory 16 and the program memory 17 are arranged in an IC card constituted by one or a plurality of IC chips.

The program memory 17 constituted by a mask ROM (Read Only Memory) or the like stores control programs having subroutine programs for executing the above functions.

Figure 4:
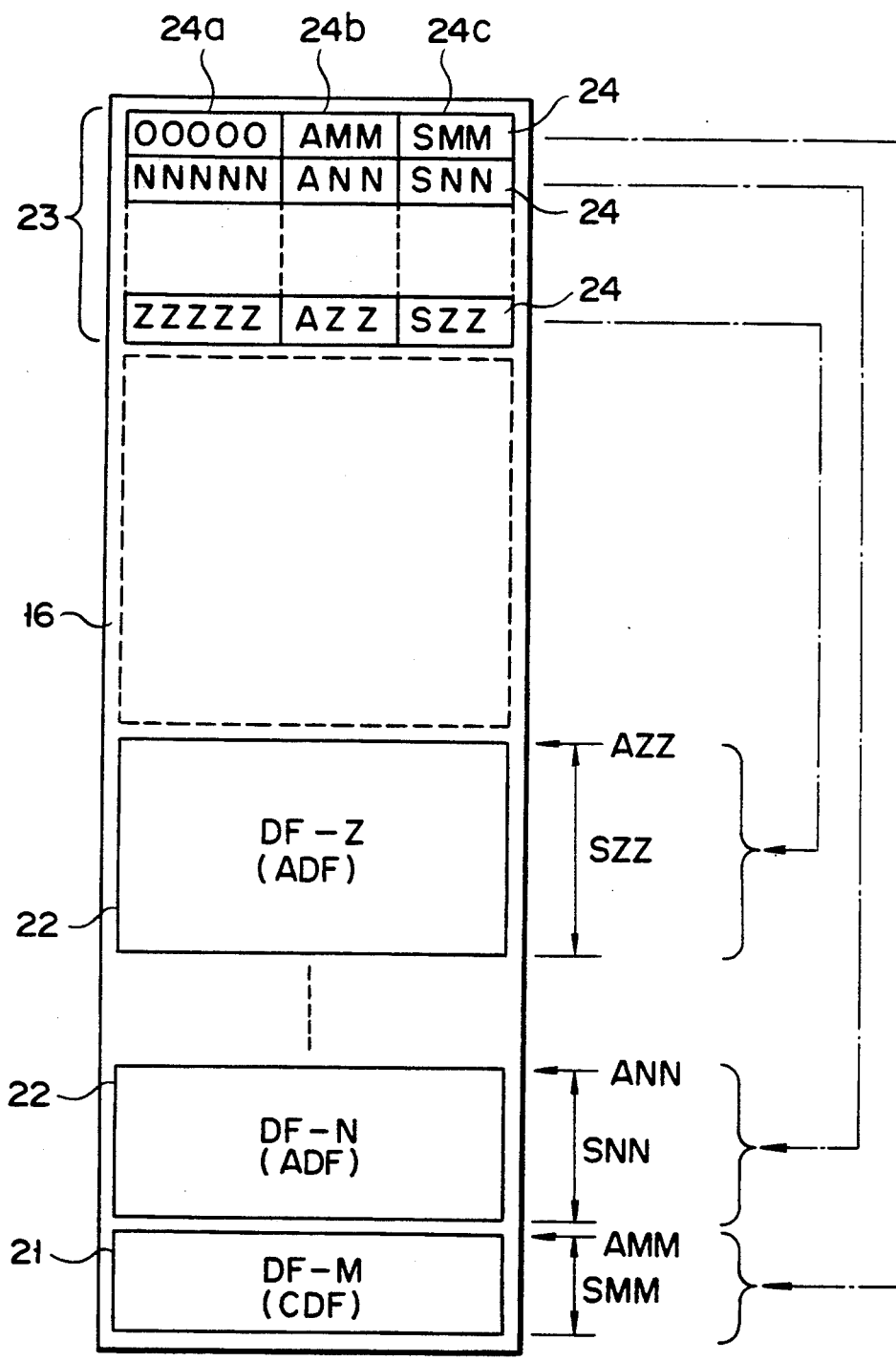
FIG. 4 is a view showing the data file structure of a data memory of the IC card.

The data memory 16 constituted by a non-volatile memory such as an EEPROM (Electrically Erasable Programmable Read Only Memory) stores various types of data. As shown in FIG. 4, the memory 16 is divisionally defined as one common data file (CDF) 21 used commonly in all applications, and a plurality of application data files (ADFs) 22 independently used for each application. The CDF 21 and the ADFs 22 are defined by data file definition data 24 of a data file definition table 23. In this case, for example, the data file definition data 24 is stored from the head address of the data memory 16. The CDF 21 and the ADFs 22 are defined from the end address.

Figure 5:
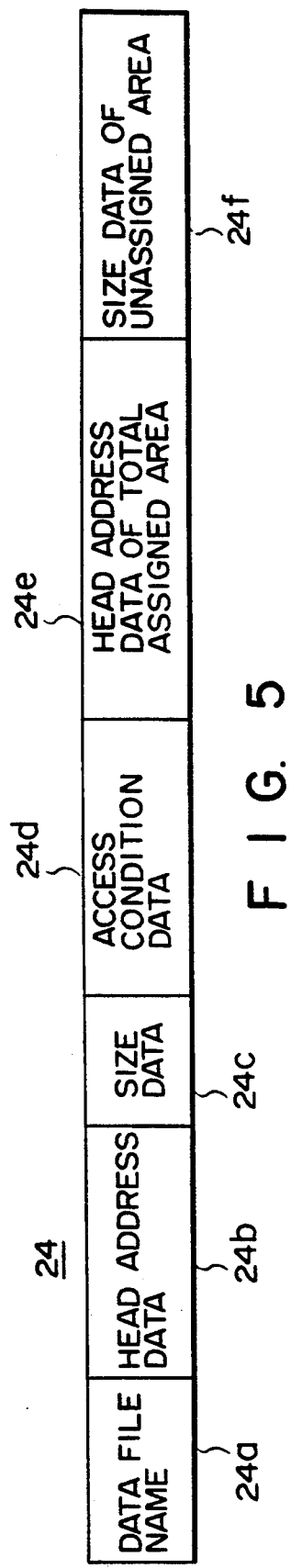
FIG. 5 is a view illustrating the format of data file definition data.

As shown in FIG. 5, the data file definition data 24 includes a data file name 24a, head address data 24b, size data 24c, access condition data 24d, head address data 24e of total assigned areas and size data 24f of an unassigned area.

If no area is defined in a defined data file, a value represented by the unassigned area size data corresponds to the maximum size value of the data file, and a value represented by the total assigned area head address data corresponds to a value obtained by incrementing the end address of the defined data file by one.

Referring to FIG. 4, the data file definition data 24 is stored in the order of data file names "00000," "NNNNN," . . . , "ZZZZZ" in accordance with data file definition command data to be described later. It should be noted a data file name "00000" of the CDF 21 is stored in advance.

Figure 6:
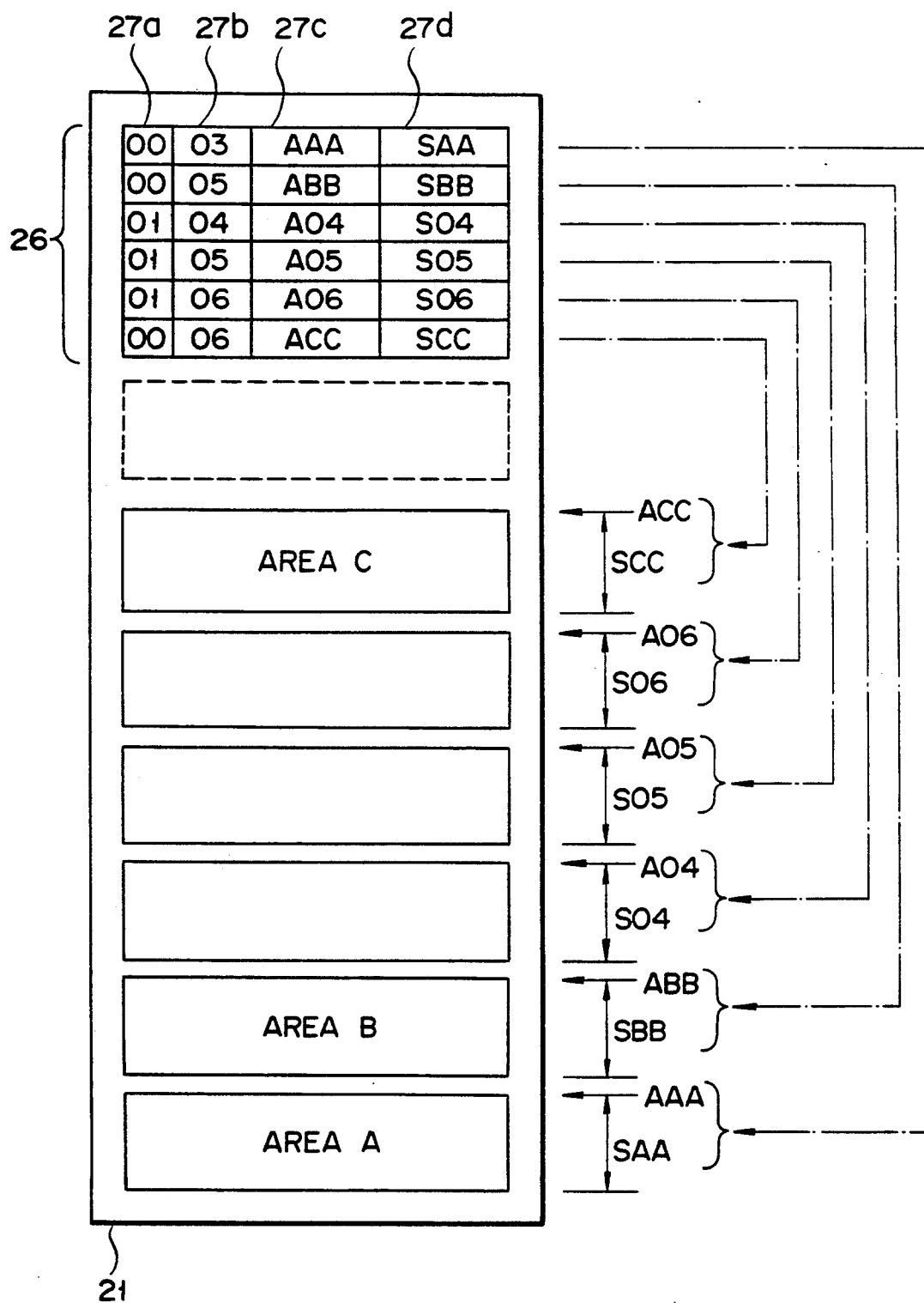
FIG. 6 is a view illustrating the area structure in a common data file.
Figure 7:
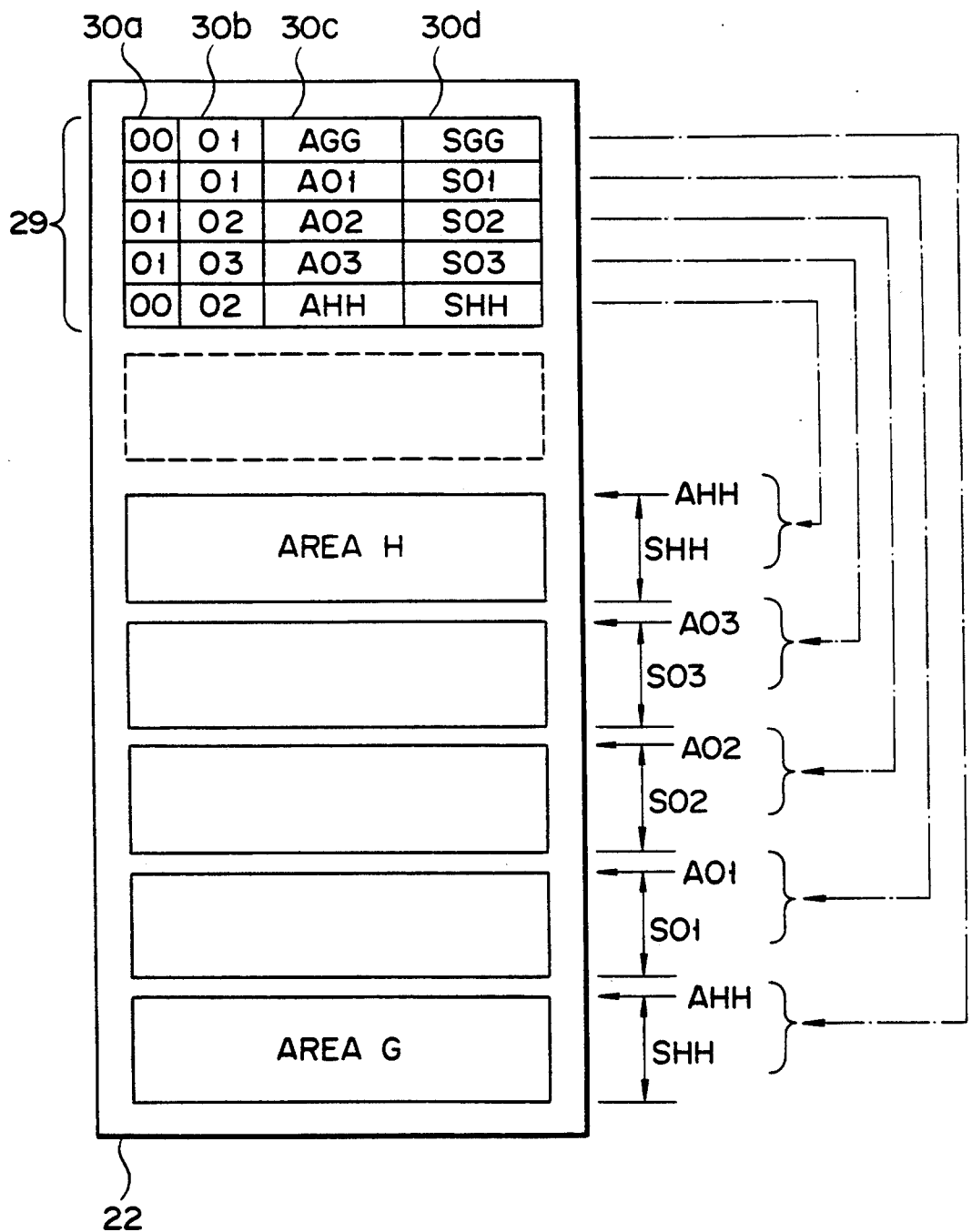
FIG. 7 is a view showing the area structure in an application data file.
Figure 10B:
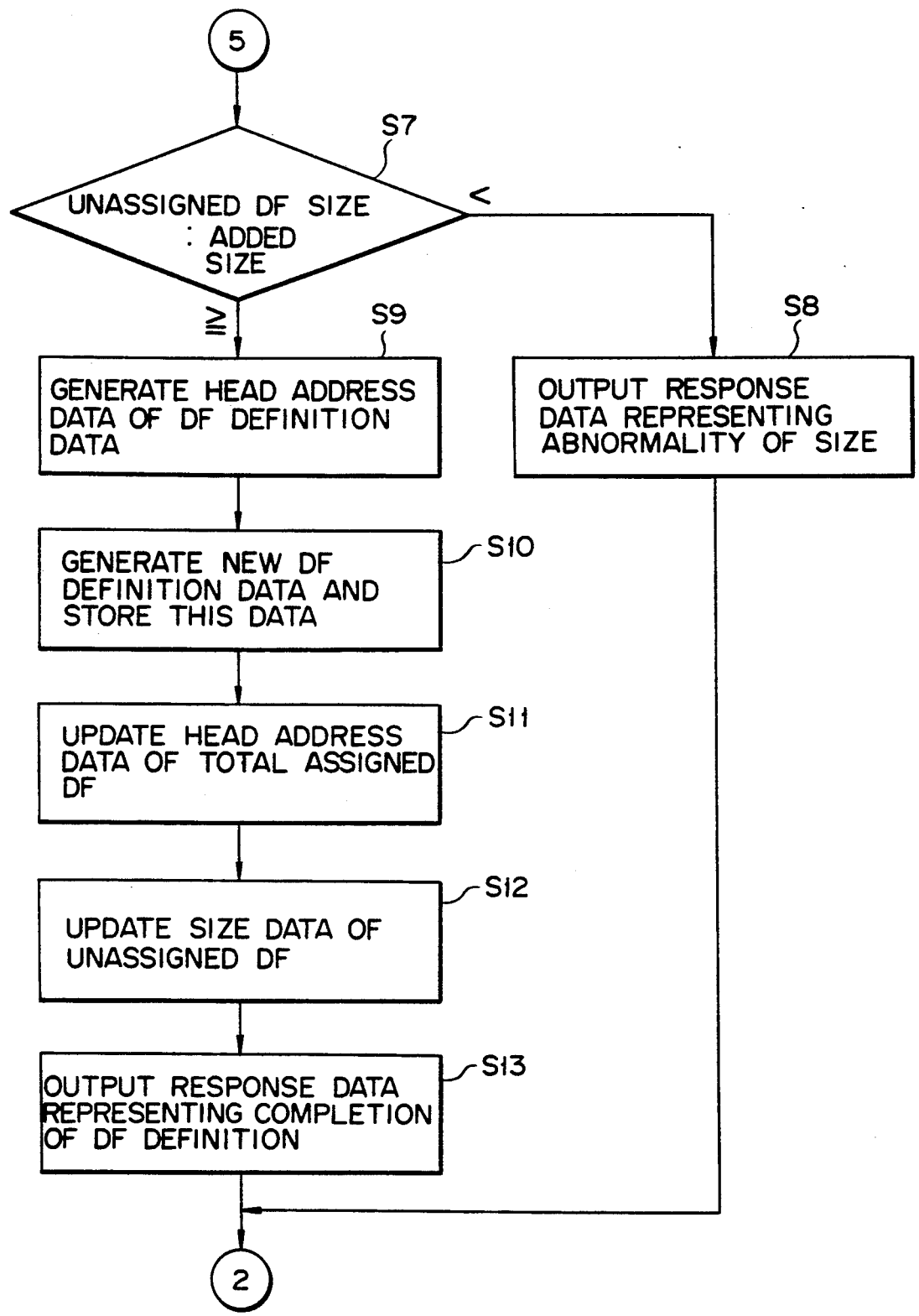
Figure 10D:
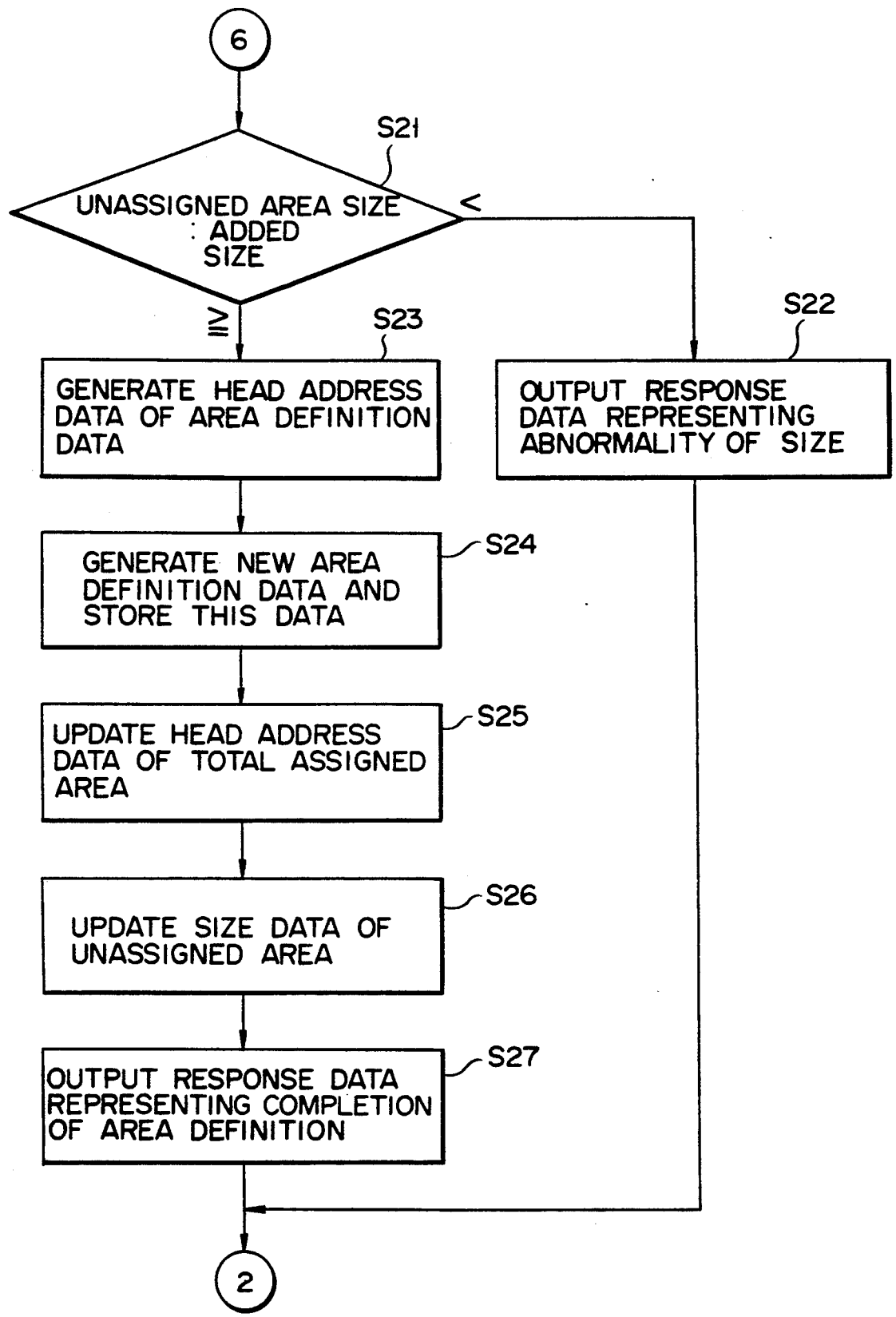
Figure 10E:
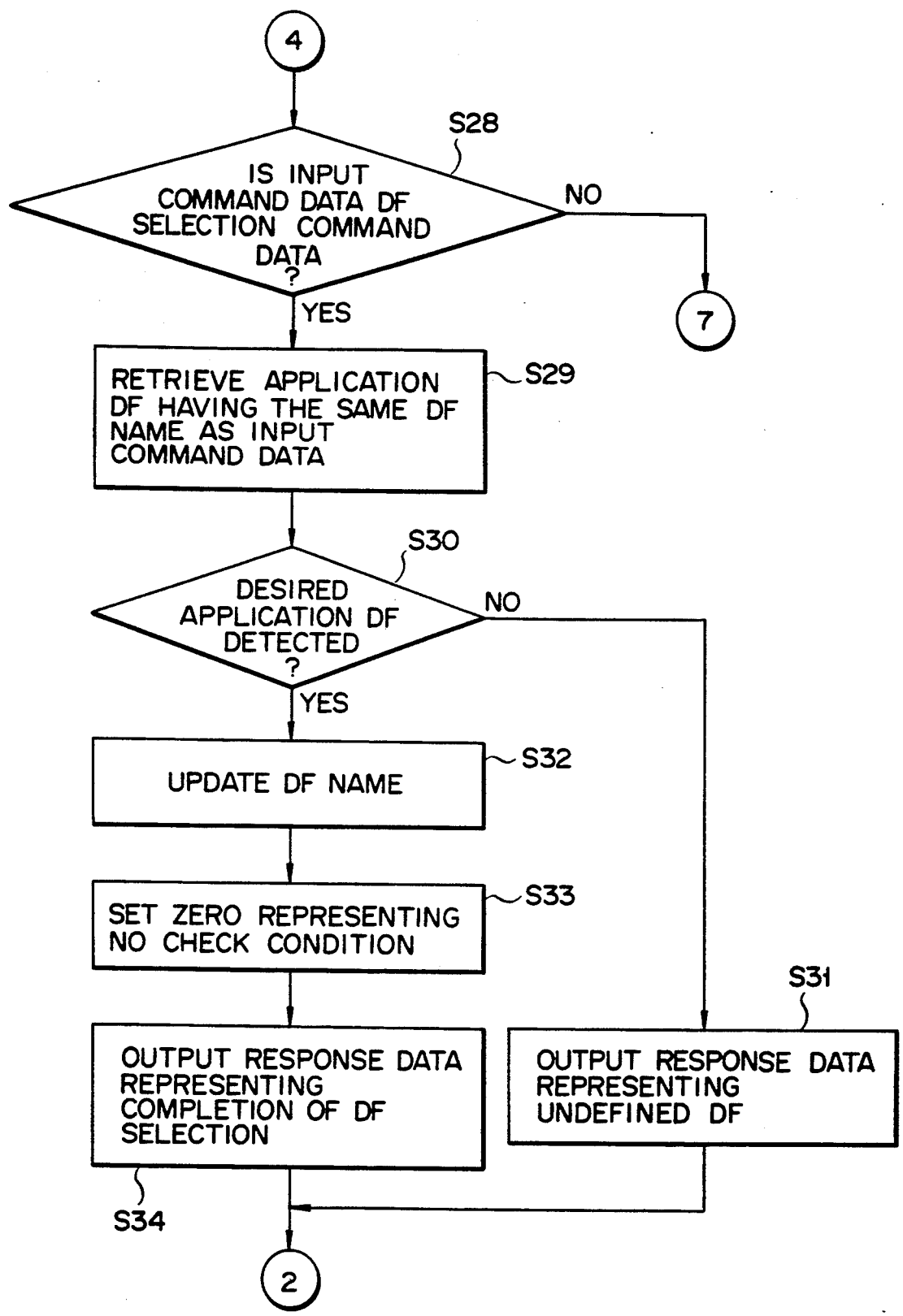
Figure 10F:
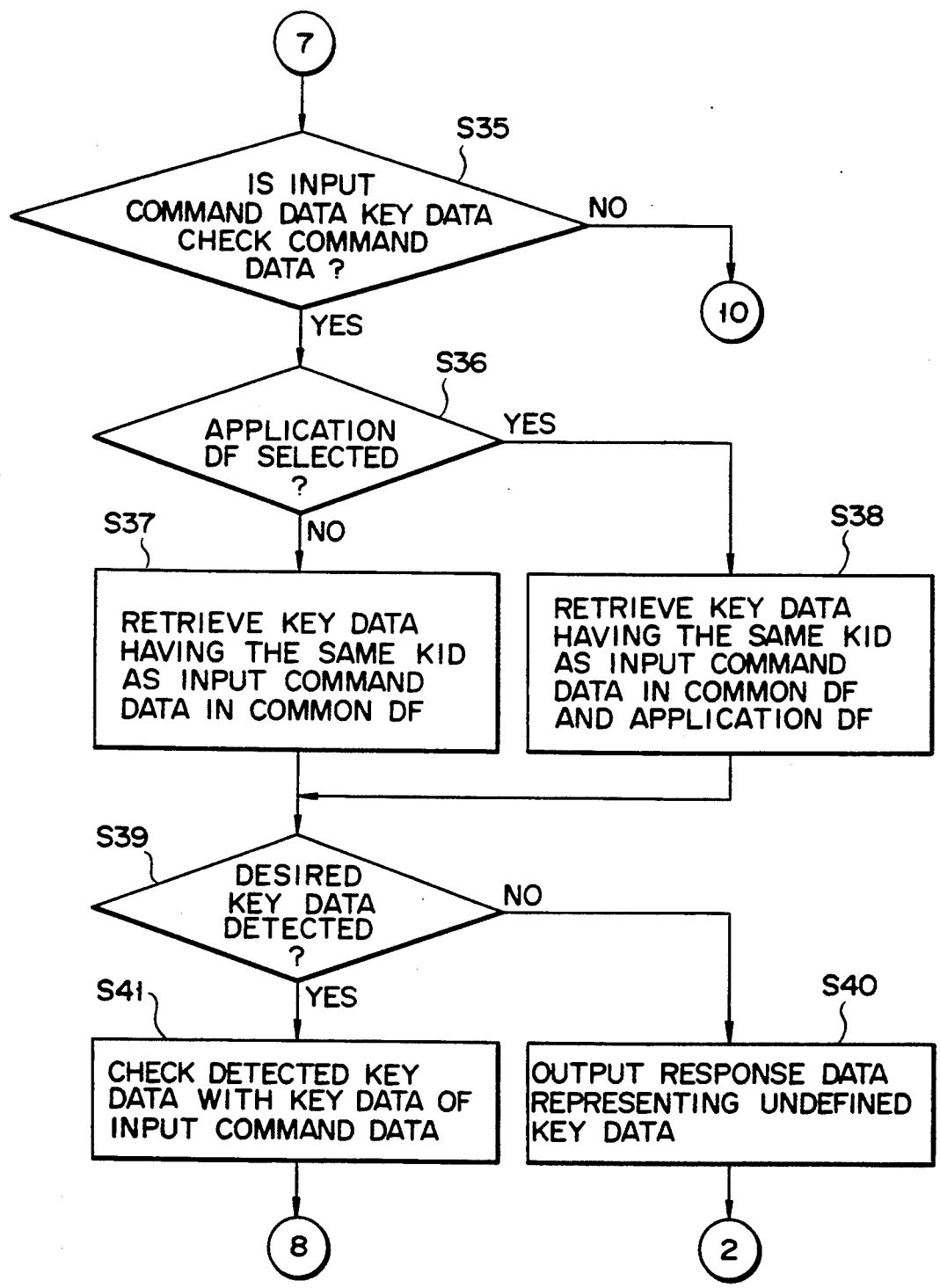
Figure 10G:
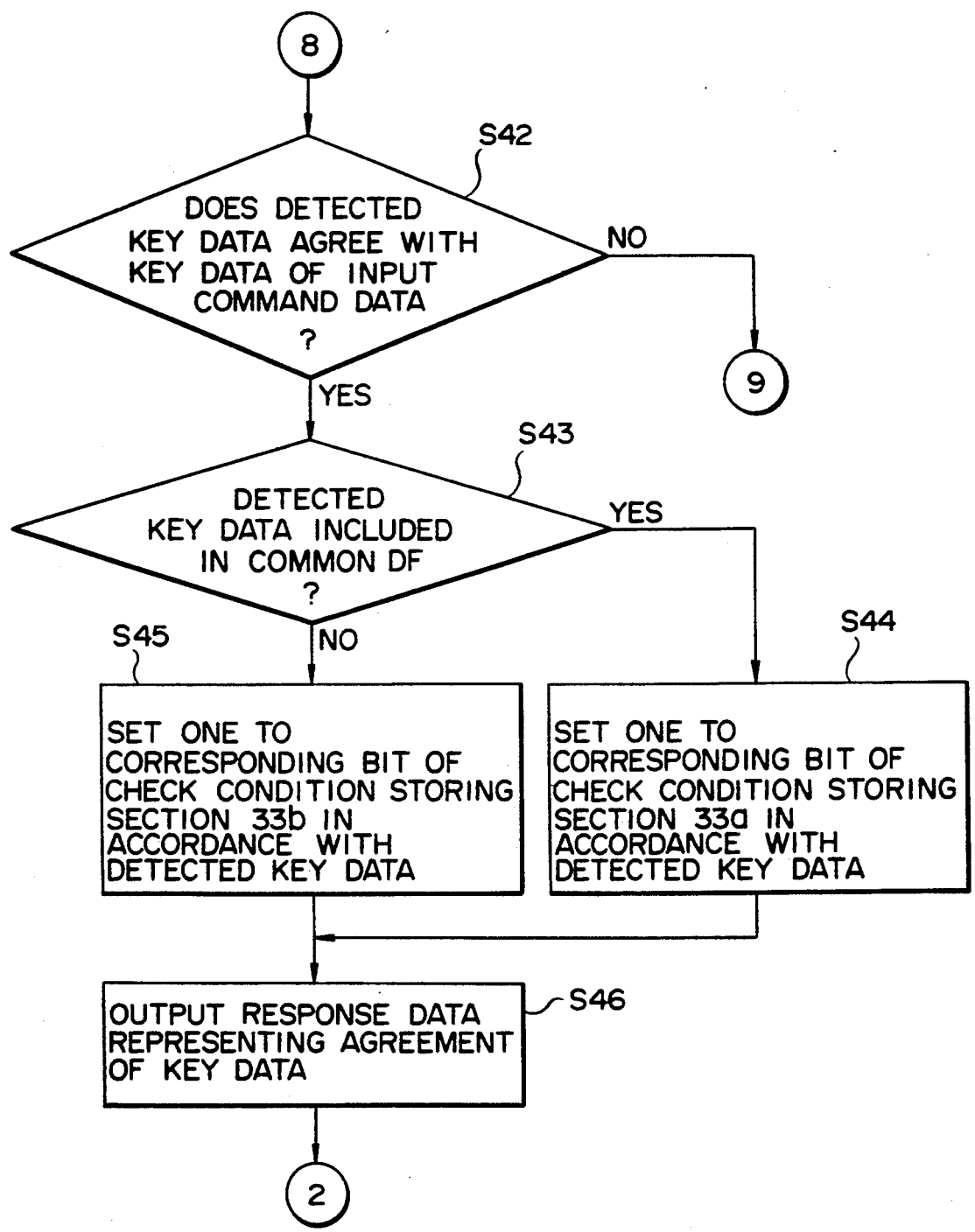
Figure 10H:
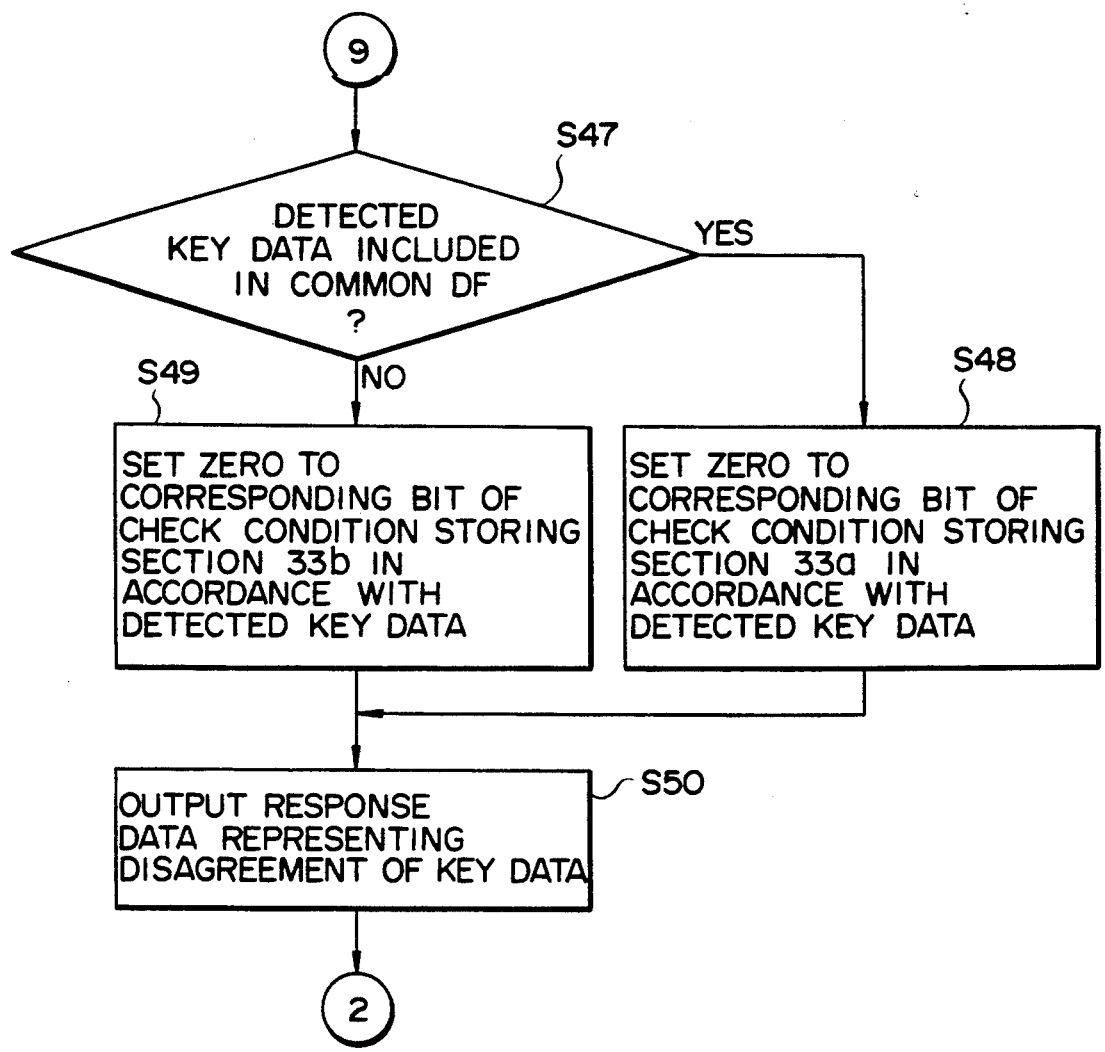
Figure 10J:
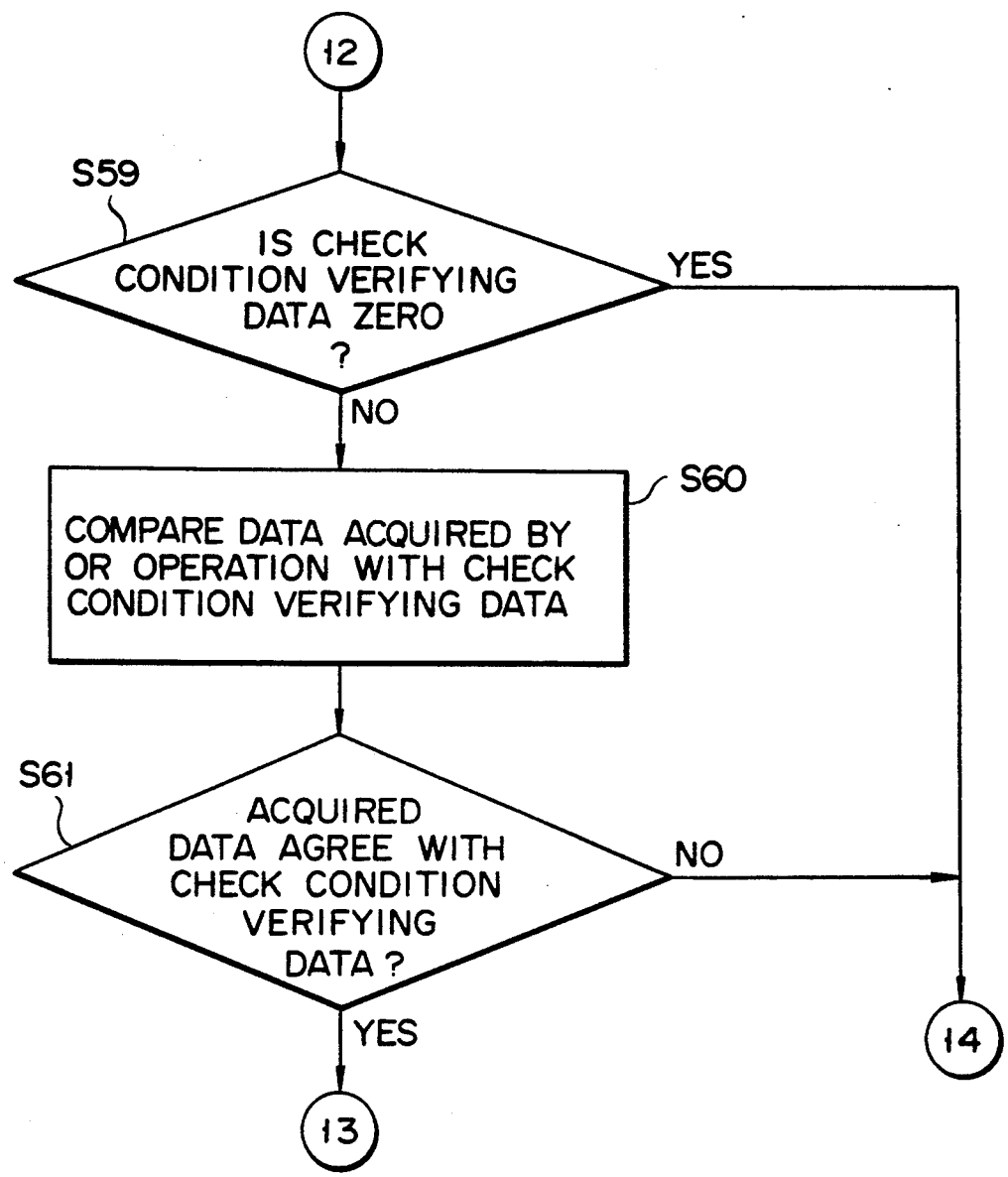
Figure 10K:
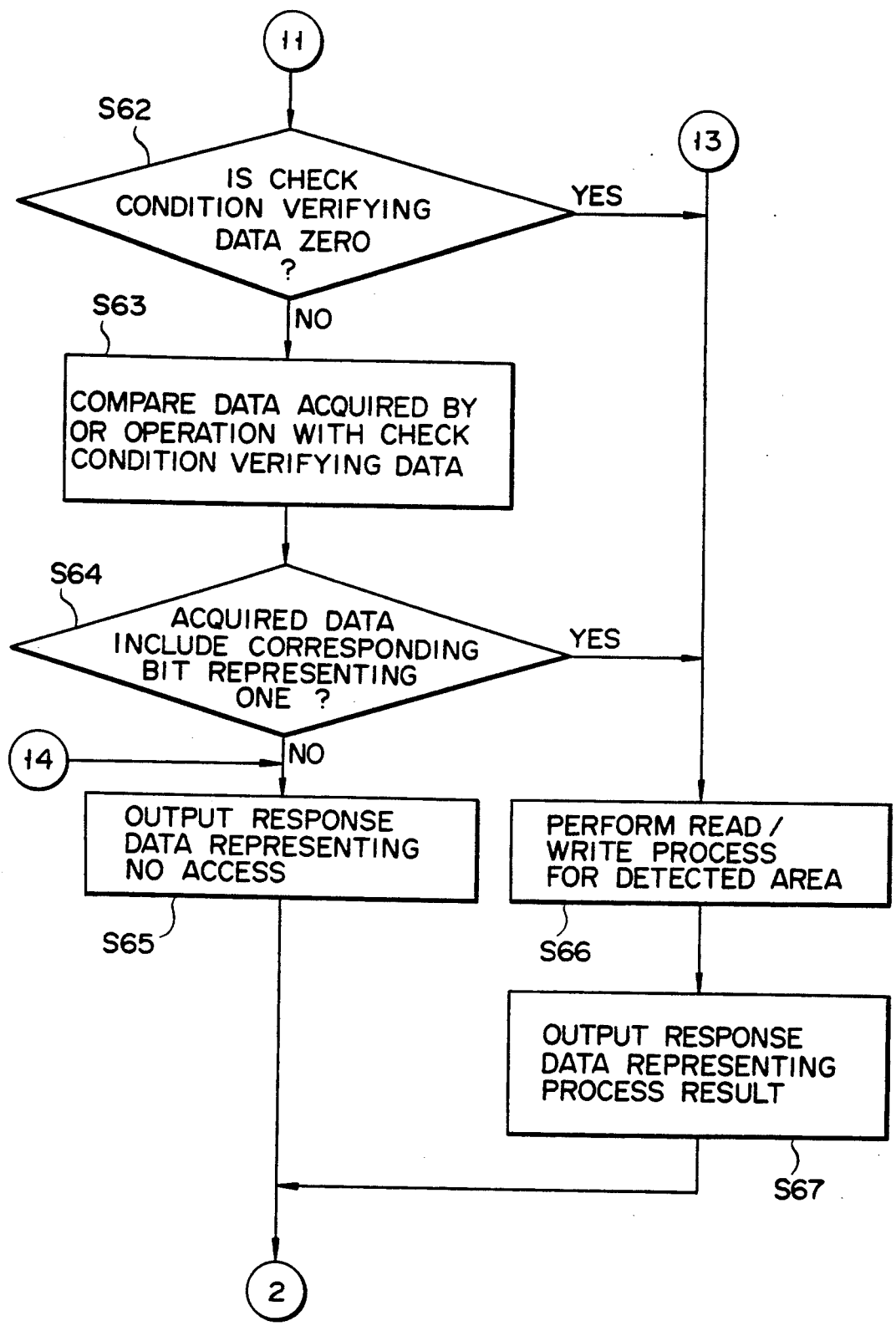

The CDF 21 is divisionally defined as shown in FIG. 6, and the ADF 22 is divisionally defined as shown in FIG. 7. Areas are defined by area definition data of area definition tables 26 and 29, respectively. For example, the area definition data are stored from the head addresses of the data files 21 and 22, respectively. The areas are defined from the end addresses of the data files 21 and 22, respectively.

Figure 8A:
FIGS. 8A and 8B are views showing the formats of area definition data and key data area definition data.

As shown in FIG. 8A, the area definition data includes an identification data 27a (30a), an area number (AID) 27b (30b), head address data 27c (30c) of an area, size data 27d (30d), and access condition data.

Figure 8B:

As shown in FIG. 8B, the key data area definition data has identification data, a key data number (KID), head address data of a key data area, size data, access condition data and check condition specifying data. This key data area definition data will be described in a later section.

As shown in FIG. 9 the data memory 16 includes an unassigned size storing section 16a and a head address storing section 16b. The section 16a stores size data of an unassigned data file. The section 16b stores head address data of a total assigned data file. If no data file is assigned, a value represented by the size data of the unassigned data file corresponds to the maximum size for assigning a data file to the data memory 16. A value represented by the head address data of the total assigned data file corresponds to a value obtained by incrementing the end address of the memory area of the data memory 16 by one.

Processes by the control unit will be described below with reference to the flowcharts shown in FIGS. 10A to 10K.

(1) Data File Definition Process

If command data is externally input in step S1, it is checked in step S2 whether o not the input command data is the data file (DF) definition command data as shown in FIG. 11.

If the input command data is not the DF definition command data in step S2, processing in step S14 to be described later is executed. If the input command data is the DF definition command data in step S2, DF definition data having the same DF name as the input command data is retrieved in the data memory 16 (step S3).

If DF definition data having the same DF name is detected in step S4, response data representing existence of the DF name is output (step S5).

If DF definition data is not detected in step S4, the size of a DF defined by the input command data is added to the size of DF definition data (step S6).

If the added size is larger than the unassigned DF size in step S7, it is determined that the DF defined by the input command data cannot be assigned to the data memory 16, and response data representing abnormality of a size is output (step S8).

If the added size is equal to or smaller than the unassigned DF size in step S7, it is determined that the DF defined by the input command data can be assigned to the data memory 16, and head address data of DF definition data is generated (step S9). It should be noted that this head address data can be calculated by using a head address of a total assigned DF stored in the head address storing portion 16b and the file size represented by the input command data.

In step S10, new DF definition data is generated and stored in the data memory 16 in accordance with a DF name, access condition data, file size data, and the new head address data generated in step S9.

In step S11, the head address data of the total assigned DF is updated. In other words, the head address data stored in the head address storing portion 16b is updated into the new head address data. In step S12, the size data of the unassigned DF is updated. That is, the size of the assigned DF and the size of the DF definition data are subtracted from the size stored in the unassigned size storing portion 16a, and a size obtained by this subtraction is stored as size data of a new unassigned DF in the storing portion 16a.

In step S13, response data representing completion of DF definition is output.

In this manner, the DF definition data 24 is stored from the head address of the memory area of the data memory 16 as shown in FIG. 4. The DFs 21 and 22 are defined by the DF definition data 24 from the end addresses.

(2) Area Definition Process

If the input command data is not the DF definition command data in step S2, it is checked in step S14 whether or not the input command data is area definition command data as shown in FIG. 12. If the input command data is not the area definition command data in step S14, processing in step S28 to be described later is executed.

If the input command data is the area definition command data in step S14, it is checked in step S15 whether or not the ADF 22 is selected. This determination is performed by referring to the DF definition data stored upon DF selection.

If the ADF 22 is not selected in step S15, area definition data having the same area number (AID) as the area member represented by the input command data, is retrieved in the CDF 21 (step S17). It should be noted that if the input command data is the key data area definition data, key data area definition data having the same key data number (KID) as the key data number represented by the input command data, is retrieved.

If the ADF 22 is selected in step S15, area definition data having the same area number as represented by the input command data is retrieved in the CDF 21 and the ADF 22 (step S16).

If area definition data having the same area number as represented by the input command data is detected in step S18, response data representing existence of the area number is output (step S19).

If desired area definition data is not detected in step S18, the size of area definition data is added to the area size represented by the input command data (step S20).

In step S21, the added size obtained in step S20 is compared with an unassigned area size. If the ADF 22 is not selected, unassigned area size data represented by DF definition data for defining the CDF 21 is used. If the ADF 22 is selected, unassigned area size data represented by DF definition data for defining the ADF 22 is used.

If the added size is larger than the unassigned area size in step S21, it is determined that the area defined by the input command data cannot be assigned to the DF, and response data representing abnormality of the size is output (step S22).

If the added size is equal to or smaller than the unassigned area size in step S21, it is determined that the area defined by the input command data can be assigned to the DF, and head address data represented by the area definition data is generated (step S23). This head address data is calculated in accordance with a total assigned area head address represented by the DF definition data and the area size represented by the input command data. It should be noted that if the ADF 22 is not selected, total assigned area size data represented by the DF definition data for defining the CDF 21 is used. If the ADF 22 is selected, total assigned area size data represented by the DF definition data for defining the ADF 22 is used.

In step S24, new area definition data is generated and stored in accordance with an area number, access condition data, area size data, and the head address data generated in step S23. It should be noted that identification data is set to "00" when the input command data is area definition command data and it is set to "01" if the input command data is key data area definition command data.

In step S25, the total assigned area head address data is updated. That is, the total assigned area head address data represented by the DF definition data is updated into the new head address data. In step S26, the unassigned area size data is updated. In other words, the assigned area size and the size of the area definition data are subtracted from the unassigned area size represented by DF definition data. The size obtained by this subtraction is stored as new unassigned area size data.

In step S27, response data representing completion of area definition is output.

Through the above processing, as shown in FIGS. 6 and 7, the area definition data is stored from the head address of the DF. The area is defined from the end address of the DF in accordance with the area definition data.

In the above manner, each DF, key data area and area are assigned to the memory. FIG. 13 is a schematic view of such memory allocation.

As shown in FIG. 13, the data memory 16 has one CDF 21 commonly used by all the applications and a plurality of ADFs 22a and 22b used for the respective applications. The DFs 21, 22a and 22b each have a plurality of key data and a plurality of areas.

A data file name (DFN) is provided to each of the ADFs 22a and 22b. Accordingly, an ADF to be accessed ca be recognized by specifying a DFN using a DF selection command data which will be described later.

As shown in FIG. 14, specifying data such as a key data number (KID) to specify key data is provided to each key data so that target key data for check can be recognized by designating the specifying data using key data check command data (to be described later).

KID01, KID02 and KID03 are respectively provided to key data 1, 2 and 3 included in the CDF 21. KID04, KID05 and KID06 are respectively provided to key data X4, X5 and X6 included in the ADF 22a. KID04, KID05 and KID06 are also provided respectively to key data Y4, Y5 and Y6 included in the ADF 22b.

Check condition specifying data is provided to each key data, and is used in checking for the key data.

Check condition specifying data is stored in check condition storing sections 33a and 33b shown in FIG. 15. With regard to key data included in the CDF 21, the check condition specifying data is stored in the storing section 33a. Regarding key data included in the ADFs 22a and 22b, the check condition specifying data is stored in the storing section 33b. A data file name storing section 34a stores the name of a DF selected by DF selection command data.

The storing sections 33a, 33b and 34a are included in the control element 15, for example.

As shown in FIG. 16, specifying data such as an area number (AID) for specifying an area is provided to each area. An area to be subjected to area processing is therefore recognized by designating the specifying data using an area process command data.

AID01 and AID02 are respectively provided to areas G and H included in the CDF 21. AID03, AID05 and AID06 are respectively provided to areas A, B and C included in the ADF 22a. Further, AID04, AID05 and AID06 are respectively provided to areas D, E and F included in the ADF 22b. In this case, in the same ADF, the specifying data provided to key data and the specifying data provided to an area have the same value except for the area A. Since which of the key data and area is to be accessed is specifically determined, however, there will arise no problem.

First and second check condition verifying data are provided to each area. Logic data (A or O) is provided to each of the first and second check condition verifying data. The first and second check condition verifying data are used to request the check condition of key data which is necessary to access an area. The logic data is used to determine which combination of check condition verifying data should be taken, AND logic (A) or OR logic (0).

FIG. 17 illustrates a conversion table for storing selection data to select, for each command data, two check condition verifying data assigned to each area. This table is included in, for example, the data memory 16.

(3) Data File Selection Process

Figure 18:
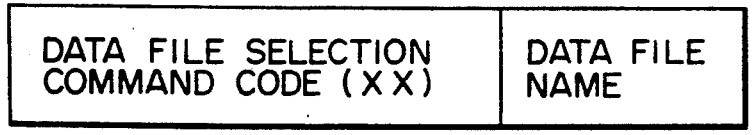
FIG. 18 is a view illustrating the format of data file selection command data.

If the input command data is not the DF definition command data in step S14, it is checked in step S28 whether or not the input command data is DF selection command data as shown in FIG. 18.

If the input command data is not the DF selection command data in step S28, processing in step S35 to be described later is executed.

If the input command data is the DF selection command data in step S28, the ADF having the same DF name as represented by the input command data is retrieved in the data memory 16 (step S29).

If the desired ADF is not detected in step S30, response data representing an undefined DF is output (step S31).

If the desired ADF is detected in step S30, its DF name is stored in the storing section 34a (step S32). "0" representing no check condition is set to all the bits of the storing portion 33a (step S33). Further, response data representing completion of DF selection is output (step S34).

(4) Key Data Check Process

Figure 19:
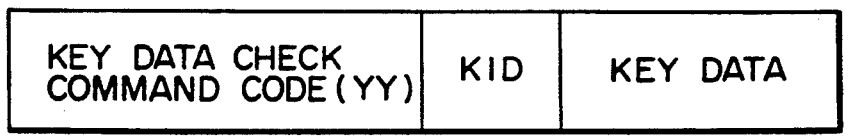
FIG. 19 is a view illustrating the format of key data check command data.

If the input command data is not the DF selection command data in step S28, it is checked in step S35 whether or not the input command data is key data check command data shown in FIG. 19.

If the input command data is not key data check command data in step S35, processing in step S51 to be described later is executed.

If the input command data is key data check command data in step S35, it is checked whether or not an ADF is selected in step S36. This determination is performed by checking a DF name stored in the storing section 34a.

If an ADF is not selected in step S36, key data having the same KID as represented by the input command data is retrieved in the CDF 21 (step S37).

If an ADF is selected in step S36, key data having the same KID as represented by the input command data is retrieved in the CDF 21 and the selected ADF 22a (or 22b) (step S38).

If the desired key data is not detected in step S39, response data representing undefined key data is output (step S40).

If the desired key data is detected in step S39, the detected key data is checked with key data represented by the input command data (step S41).

If the detected key data coincides with the key data represented by the input command data in step S42, it is checked in step S43 whether or not the detected key data is included in the CDF 21.

If the detected key data is included in the CDF 21 in step S43, "1" is set to that bit of the storing second 33a corresponding to the bit representing "1" of the check condition specifying data provided to that key data (step S44).

If the detected key data is included in the ADF 22a, 22b in step S43, "1" is set to that bit of the storing section 33b corresponding to the bit representing "1" of the check condition specifying data given to that key data (step S45).

Note that the check condition specifying data and the data stored in the storing sections 33a and 33b have the same data length.

In step S46, response data representing agreement of key data is output.

If the detected key data does not coincide with the key data represented by the input command data in step S42, it is checked in step S47 whether or not the detected key data is included in the CDF 21.

If the detected key data is included in the CDF 21 in step 47, "0" is set to that bit of the storing section 33a corresponding to the bit representing "1" of the check condition specifying data provided to that key data (step S48).

If the detected key data is included in the ADF 22a, 22b in step S47, "0" is set to that bit of the storing section 33b corresponding to the bit representing "1" of the check condition specifying data provided to that key data (step S49).

In step S50, response data representing disagreement of key data is output.

For instance, when key data 1, Y5 and Y6 is checked after the ADF 22b is selected by the DF selection command data, data stored in the storing sections 33a, 33b and 34a would be "10000000," "00001100" and "YYY," respectively. If the ADF 22a is selected thereafter, the data in the storing section 33a is not changed but the data in the storing section 33b and 34a are changed to "00000000" and "XXX," respectively.

(5) Area Process (Read, Write and Erase of Data in an Area)

Figure 20:
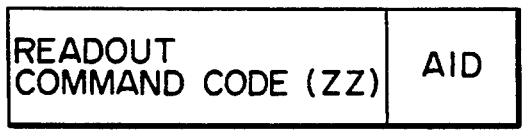
FIG. 20 is a view showing the format of readout command data.
Figure 21:
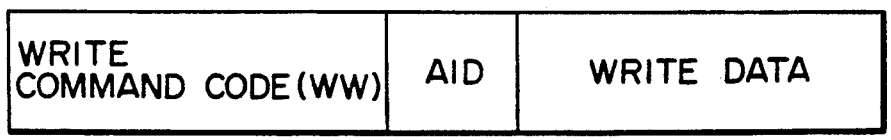
FIG. 21 is a view showing the format of write command data.
Figure 22:
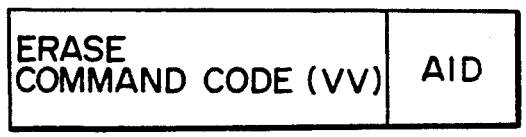
FIG. 22 is a view showing the format of erase command data.

If the input command data is not the key data check command data in step S35, it is checked in step S51 whether or not the input command data is area process command data. This area process command data includes readout command data (FIG. 20), write command data (FIG. 21) or erase command data (FIG. 22).

If the input command data is area process command data in step S51 it is checked in step S52 whether or not the ADF is selected. This determination is performed by checking the DF name stored in the storing section 34a.

If ADF is not selected in step S52, an area having the same AID as represented by the input command data is retrieved in the CDF (step S53).

If an ADF is selected in step S52, an area having the same AID as represented by the input command data is retrieved in the CDF and the ADF (step S54).

If the desired area is not detected in step S55, response data representing undefined area is output (step S56).

If the desired area is detected in step S55, an OR operation of the data stored in the check condition storing sections 33a and 33b is performed (step S57).

Two check condition verifying data (see FIG. 16) assigned to each area are selected by retrieving the same command code as the input command data referring to the conversion table shown in FIG. 17.

For instance, if the area process command data is readout command data, its command code is "ZZ." Therefore, the first check condition verifying data is selected by the selection data "1" corresponding to this command code. If the area process command data is write command data or erase command data, its command code is "WW" or "VV." Accordingly, the second check condition verifying data is selected by the selection data "2" corresponding to these command codes.

In step S58 it is checked whether or not logic data provided to selected first or second check condition verifying data indicates an AND operation.

If the logic data indicates an AND operation in step S58, it is then checked in step S59 whether or not all the bits of the check condition verifying data are "0."

If these bits are "0" in step S59, response data representing no access is output (step S65). If all the bits of the check condition verifying data are not "0" in step S59, this check condition verifying data is compared with the data acquired by the logical operation in step S57 (step S60).

If the check condition verifying data does not coincide with the data acquired by the logical operation in step S61, the aforementioned process in step S65 is executed. If a coincidence occurs in step S61, however, a read/write process is performed on the detected area (step S66), and response data representing the processing result is output (step S67).

If the logic data does not indicate an AND operation in step S58, i.e., if it indicates an OR operation, it is then checked in step S62 whether or not all the bits of the check condition verifying data are "0."

If these bits are "0" in step S62, the aforementioned processes in steps S66 and S67 are executed.

If all the bits of the check condition verifying data are not "0" in step S62, this check condition verifying data is compared with the data acquired by the logical operation in step S57 (step S63).

In step S64, it is checked whether or not the data acquired by the logical operation and the check condition verifying data includes corresponding bits indicating "1." It should be noted that the data acquired by the logical operation and the check condition verifying data have the same bit length.

If there is no corresponding bit indicating "1" in step S64, the process of step S65 is executed. If there are corresponding bits indicating "1" in step S64, the processes of steps S66 and S67 are executed.

In FIG. 13, the first check condition verifying data provided to the area B is "10000000" and its logical data is a logical operation (A). Therefore, read access to the area B can be performed only by checking the key data 1. As the second check condition verifying data is "00000000" and its logical data is a logical operation (O), access to the area B for data writing and data erasing can be performed without check of the key data.

The first check condition verifying data provided to the area C is "00000000" and its logical data is a logical operation (A). Therefore, read access to the area C cannot be performed by the check of the key data 1 only. As the second check condition verifying data is "00001100" and its logical data is a logical operation (O), access to the area C for data writing and data erasing can be performed only by checking of the key data X5 or X6.

If write access to the area C is executed by selecting the ADF 22a after check of the key data Y5 and Y6, the check condition verifying data of the key data Y5 and Y6 are cleared when the data file is selected. This means that the check condition verifying data of the key data of the ADFs 22a and 22b are effective only to accessing to an area within the same ADF.

Although the key data X4 of the ADF 22a and the key data X4 of the ADF 22b have the same KID, there will not occur any problem because only one of the ADFs is subjected to an accessing operation in the case of specifying by the KID. It should be however noted that the same KID should not be used between the CDF and ADFs. The same applies to AID.

The number of the check condition verifying data provided to each area can be changed according to a process to area.

By separately assigning the KID provided to key data and the AID provided to an area, the number of areas to a memory does not affect the number of key data.

Data other than the specifying data provided to an area of a CDF may serve as specifying data to an area in an ADF. In this case, only single program can be applied to each system having a manner for providing the specifying data, thus permitting access to areas in a CDF and an ADF by the same command data.

Further, data other than the specifying data provided to key data of a CDF may serve as specifying data to key data in an ADF. In this case, only single program can be applied to each system having a manner for providing the specifying data, thus permitting access to key data in a CDF and an ADF by the same command data.

The present invention is not restricted to the above-described embodiment, but may be modified in various manners within the scope and spirit of the invention.

What is claimed is:

1. A method for allocating new file area in a memory area of a memory of an IC card having an identification area and a plurality of data file areas, the identification area for storing file identification information having a name of a data file and a head address of the data file and used to identify the data file, the memory area being divided by a plurality of data files, each of the data file areas being allocated in the memory area using the file identification information, data being written into the data file areas by using the file identification information, the method performed on said IC card and comprising the steps of:

receiving a file identification command and a name of new data file to be allocated, from an external device;

determining whether the name of the new data file is the same as any name of a data file in the memory area of the memory, in accordance with the file identification information stored in the memory, when the file identification command is received from the external device;

allocating the new data file by writing the received name of the new data file to be allocated and size information into the identification area only when the name of the new data file is determined not to be the same in said determining step; and outputting data representing that the name of the data file has been written from the IC card to the external device when the name of the new data file is determined to coincide with a name of the data file allocated in the memory area of the memory.

2. The method according to claim 1, wherein each of the data files includes an identification area and a plurality of other areas, comprising the further steps of storing area identification information having a name of an area and a head address of the area and used to identify the area in the identification area, the areas being allocated in the data file using the area identification information, data being written into the areas using the area identification information.

3. The method according to claim 1, wherein said file identification command is an area identification command which has a name of an area and a head address of the area used to identify the area.

4. A method for allocating new file area in a memory area of a memory of an IC card having an identification area and a plurality of other areas, the identification area for storing file identification information having a name of an area data file and a head address of the data file and used to identify the area in the identification area, the areas being allocated in the data file using the area identification information, data being written into the areas using the area identification information, the method performed on said IC card and comprising the steps of:

receiving an area identification command and a name of new area to be allocated, from an external device;

determining whether the name of the new area coincides with a name of an area allocated in the area data file of the memory in accordance with the area identification information stored in the memory when the area identification command is received from the external device;

allocating the new area by writing the received name of the new area to be allocated and size information into the identification area only when the name of the new area is different from the name of the area allocated in the data file of the memory; and stopping writing the received name of the area to be allocated and size information to the identification area and outputting data representing that the name of the area has been written from the IC card to the external device when the name of the new area coincides with the name of the area allocated in the data file of the memory.

5. An IC card comprising:

a memory including a file identification table, a plurality of data file areas, an unallocated size storage section and a head address storage section, the file identification table for storing file identification information having a name of a data file, a size of the data file, and a head address of the data file and used to identify the data file, the memory being divided by a plurality of data files, each of the data file areas being allocated in the memory area by using the file identification information, data being written into or read out from the data file areas by using he file identification information, a size of an unallocated area of the memory area in which the data file is not allocated being stored in the unallocated size storage section, a head address of the unallocated area being stored in the head address storage section;

means for receiving a file identification command, a name of a new data file to be allocated, and a size of the new data file, from an external device;

means for determining whether the name of the new data file is the same as a name of a data file allocated in the memory area of the memory in accordance with the file identification information stored in the memory when the file identification command is received from the external device;

means for adding the size of the new data file to a size of the file identification information for identifying the new data file when the name of the new data file is different from the name of the data file allocated in the memory area of the memory;

means for comparing an added size with the size of the unallocated area stored in the unallocated size storage section;

means for generating a head address of the new data file to be allocated in accordance with the head address of the unallocated area stored in the head storage section and the size of the new data file to be allocated when the added size is equal to or smaller than the size of the unallocated area;

means for writing new file identification information including the received name of the new data file to be allocated into the file identification table, the size of the new data file, and the generated head addresses of the new data file, thereby allocating the new data file;

means for preventing writing the file identification information of the new data file to the file identification table and outputting data representing that the name of the data file has been written from the IC card to the external device when the name of the new data file coincides with the name of the data file allocated in the memory area of the memory or when the added size is larger than the size of the unallocated area; and means for writing data into or reading data out form the new data file in accordance with the written file identification information.

6. The IC card according to claim 5, wherein each of the data files in the memory means includes an identification area and a plurality of data file areas, area identification information having a name of an area, a head address of the area, and a size of the area and used to identify the area being stored in the identification area, the data file being divided by a plurality of areas, each of the data file areas being allocated in the data file by using the area identification information.

7. An IC card comprising:

a memory including a file identification table, a plurality of data file areas, an unallocated size storage section and a head address storage section, the file identification table for storing file identification information having a name of a data file, a size of the data file, and a head address of the data file and used to identify the data file, the memory being divided by a plurality of data files, each of the data file areas being allocated in the memory area by using the file identification information, data being written into or read out from the data file areas by using the file identification information, a size of an unallocated area of the memory area in which the data file is not allocated being stored in the unallocated size storage section, a head address of the unallocated area being stored in the head address storage section;

means for receiving an area identification command and a name of new area to be allocated, from the external device;

means for determining whether the name of the new area coincides with a name of an area allocated in the data file of the memory in accordance with the area identification information stored in the memory when the area identification command is received form the external device;

means for allocating the new area by writing the received name of the new area to be allocated and size information into the identification area when the name of the new area is different from the name of the area allocated in the data file of the memory; and means for preventing writing of the received name of the area to be allocated and size information to the identification area and outputting data representing that the name of the area has been written from the IC card to the external device when the name of the new area coincides with a name of the area allocated in the data file of the memory.

* * * * *